US011535541B2

(12) United States Patent
Gupta

(10) Patent No.: US 11,535,541 B2
(45) Date of Patent: Dec. 27, 2022

(54) METHOD FOR ONSITE PRODUCTION OF CHLORINE DIOXIDE

(71) Applicant: Ecolab USA Inc., St. Paul, MN (US)

(72) Inventor: Amit Gupta, Aurora, IL (US)

(73) Assignee: ECOLAB USA INC., St. Paul, MN (US)

( * ) Notice: Subject to any disclaimer, the term of this patent is extended or adjusted under 35 U.S.C. 154(b) by 184 days.

(21) Appl. No.: 15/905,030

(22) Filed: Feb. 26, 2018

(65) Prior Publication Data

US 2018/0244550 A1   Aug. 30, 2018

Related U.S. Application Data

(60) Provisional application No. 62/463,851, filed on Feb. 27, 2017.

(51) Int. Cl.
| | | |
|---|---|---|
| C02F 1/76 | (2006.01) | |
| C02F 1/72 | (2006.01) | |
| C01B 11/02 | (2006.01) | |
| C02F 103/02 | (2006.01) | |

(52) U.S. Cl.
CPC ............ *C02F 1/76* (2013.01); *C01B 11/026* (2013.01); *C02F 1/722* (2013.01); *C02F 2103/023* (2013.01); *C02F 2209/04* (2013.01); *C02F 2209/06* (2013.01); *C02F 2209/29* (2013.01); *C02F 2303/20* (2013.01)

(58) Field of Classification Search
CPC .... C02F 1/76; C02F 1/722; C02F 1/72; C02F 2103/023; C02F 2209/04; C02F 2209/06; C02F 2209/29; C02F 2303/20; C02F 1/50; C02F 103/02; C01B 11/026; C01B 11/02

USPC .......................................................... 210/739
See application file for complete search history.

(56) References Cited

U.S. PATENT DOCUMENTS

| | | |
|---|---|---|
| 2,614,645 A | 10/1952 | Wilhelm |
| 2,833,624 A | 5/1958 | Sprauer |
| 2,971,896 A | 2/1961 | Curl |
| 3,502,443 A | 3/1970 | Westerlund |
| 4,250,144 A | 2/1981 | Ratigan |
| 4,590,057 A | 5/1986 | Hicks |
| 4,678,655 A | 7/1987 | Twardowski |
| 4,790,943 A | 12/1988 | Dunn et al. |

(Continued)

FOREIGN PATENT DOCUMENTS

| | | |
|---|---|---|
| CA | 2539984 A1 | 9/2005 |
| CN | 1488571 | 4/2004 |

(Continued)

OTHER PUBLICATIONS

DuPont™ Oxone® Monopersulfate Compound (K20101), The Right Choice for Oxidation, 3 pages (2008).

(Continued)

*Primary Examiner* — Akash K Varma
(74) *Attorney, Agent, or Firm* — Eric D. Babych; Barnes & Thornburg LLP

(57) ABSTRACT

The methods disclosed generally relate to treatment of process water using chlorine dioxide. Specifically, reactants may be fed asynchronously into a diluent line or a tank where the reactants may mix and react to form chlorine dioxide. The chlorine dioxide levels may fluctuate in the diluent line or the tank thereby inhibiting or reducing the growth of microbes.

19 Claims, 6 Drawing Sheets

(56) References Cited

U.S. PATENT DOCUMENTS

| | | | |
|---|---|---|---|
| 4,886,653 A | 12/1989 | Gasper et al. | |
| 5,091,166 A | 2/1992 | Engstrom et al. | |
| 5,227,031 A | 7/1993 | Sundblad | |
| 5,273,733 A | 12/1993 | Winters et al. | |
| 5,366,714 A | 11/1994 | Bigauskas | |
| 5,376,350 A | 12/1994 | Tenney et al. | |
| 5,380,517 A | 1/1995 | Sokol | |
| 5,380,518 A | 1/1995 | Roozdar | |
| 5,399,288 A | 3/1995 | Marzouk et al. | |
| 5,399,332 A | 3/1995 | Pu | |
| 5,813,998 A | 9/1998 | Dias | |
| 5,855,861 A | 1/1999 | Lee | |
| 5,858,322 A | 1/1999 | Gray | |
| 5,863,584 A | 1/1999 | Thomas, Jr. et al. | |
| 5,895,638 A | 4/1999 | Tenney | |
| 5,906,943 A | 5/1999 | Skorpik et al. | |
| 5,968,454 A | 10/1999 | Deacon et al. | |
| 6,385,558 B1 | 5/2002 | Schlemm | |
| 6,387,344 B1 | 5/2002 | Tenney et al. | |
| 6,428,696 B2 | 8/2002 | Küke | |
| 6,468,479 B1 | 10/2002 | Mason et al. | |
| 6,790,427 B2 | 9/2004 | Charles et al. | |
| 6,840,251 B2 | 1/2005 | Gill et al. | |
| 7,322,243 B2 | 1/2008 | Liu et al. | |
| 7,407,642 B2 | 8/2008 | Mussari et al. | |
| 7,452,511 B2 | 11/2008 | Schmitz et al. | |
| 7,498,720 B2 | 3/2009 | Loebl et al. | |
| 7,507,317 B2 | 3/2009 | Babchin et al. | |
| 7,998,538 B2 | 8/2011 | Greengard et al. | |
| 8,168,153 B2 | 5/2012 | Sokol et al. | |
| 8,318,476 B2 | 11/2012 | Parker et al. | |
| 8,486,276 B2 | 7/2013 | Duve | |
| 8,647,598 B2 | 2/2014 | Grimland et al. | |
| 8,691,154 B2 | 4/2014 | Sperry et al. | |
| 8,784,733 B2 | 7/2014 | Alarid et al. | |
| 9,061,927 B2 | 6/2015 | Belluati et al. | |
| 9,238,587 B2 | 1/2016 | Mason | |
| 9,743,670 B2 | 8/2017 | Grund | |
| 10,501,345 B2 | 12/2019 | Xiong et al. | |
| 2002/0014463 A1 | 2/2002 | Iverson et al. | |
| 2003/0031621 A1* | 2/2003 | Gravitt | C01B 11/023 423/477 |
| 2003/0091497 A1 | 5/2003 | Mason et al. | |
| 2003/0200997 A1* | 10/2003 | Gill | A61L 9/145 134/22.12 |
| 2003/0203827 A1* | 10/2003 | Cooper | A61L 2/16 510/247 |
| 2004/0175322 A1 | 9/2004 | Woodruff et al. | |
| 2005/0150520 A1* | 7/2005 | Gill | A61L 2/18 134/22.1 |
| 2005/0186131 A1 | 8/2005 | Charles et al. | |
| 2005/0244328 A1* | 11/2005 | Schmitz | A61L 2/20 423/477 |
| 2006/0021872 A1 | 2/2006 | O'Leary et al. | |
| 2006/0051285 A1 | 3/2006 | Hawker et al. | |
| 2006/0133983 A1 | 6/2006 | Charles et al. | |
| 2007/0116637 A1 | 5/2007 | Woodruff et al. | |
| 2007/0237708 A1 | 10/2007 | Woodruff et al. | |
| 2009/0159538 A1 | 6/2009 | Duve | |
| 2010/0063309 A1 | 3/2010 | Bunning et al. | |
| 2010/0155341 A1* | 6/2010 | Duve | A01N 59/00 210/756 |
| 2011/0182800 A1 | 7/2011 | Hultén et al. | |
| 2011/0262342 A1 | 10/2011 | Richardson et al. | |
| 2012/0021062 A1* | 1/2012 | Gupta | C02F 1/50 424/600 |
| 2012/0183469 A1 | 7/2012 | Mussari | |
| 2012/0294794 A1 | 11/2012 | Pelin | |
| 2012/0305494 A1 | 12/2012 | DiMascio | |
| 2013/0015113 A1 | 1/2013 | Mussari | |
| 2013/0106003 A1 | 5/2013 | Duve | |
| 2013/0209349 A1 | 8/2013 | Vilhelmsson et al. | |
| 2014/0138325 A1 | 5/2014 | Tomsheck | |
| 2014/0299552 A1 | 10/2014 | Stewart et al. | |
| 2014/0302176 A1* | 10/2014 | Grund | C01B 11/024 424/661 |
| 2014/0305881 A1 | 10/2014 | Alarid et al. | |
| 2015/0021276 A1 | 1/2015 | Rahkola et al. | |
| 2016/0029639 A1 | 2/2016 | DiMascio et al. | |
| 2017/0064949 A1 | 3/2017 | Kraus et al. | |

FOREIGN PATENT DOCUMENTS

| | | | |
|---|---|---|---|
| CN | 2654587 Y | 11/2004 | |
| CN | 2700312 Y | 5/2005 | |
| CN | 100405027 C | 7/2008 | |
| CN | 202880867 U | 4/2013 | |
| CN | 105752931 A | 7/2016 | |
| CN | 205472644 U | 8/2016 | |
| DE | 102008042424 A1 | 6/2009 | |
| DE | 102010027840 A1 | 10/2011 | |
| EP | 0119686 | 9/1984 | |
| EP | 0850875 A1 | 7/1998 | |
| EP | 2581340 A1 | 4/2013 | |
| EP | 3601157 B9 | 8/2021 | |
| FR | 2949908 A1 | 3/2011 | |
| GB | 1056790 | 1/1967 | |
| JP | H03-83802 | 4/1991 | |
| WO | WO 2001/077012 A1 | 10/2001 | |
| WO | WO 03/000586 A1 * | 1/2003 | C01B 11/02 |
| WO | WO 2003/000586 A1 | 1/2003 | |
| WO | WO 2006/062455 A1 | 6/2006 | |
| WO | WO 2008/058206 A2 | 5/2008 | |
| WO | WO 2008/125075 A1 | 10/2008 | |
| WO | 2011131389 A1 | 10/2011 | |
| WO | WO 2013/048899 A2 * | 4/2013 | A01N 59/00 |
| WO | WO 2016/140772 A1 | 9/2016 | |
| WO | WO 2016/145487 A1 | 9/2016 | |
| WO | WO-2016140772 A1 * | 9/2016 | C01B 11/022 |

OTHER PUBLICATIONS

DuPont™ Oxone® Monopersulfate Compound (k20102), General Technical Attributes, 4 pages (2008).

International Search Report and Written Opinion of International Application No. PCT/US2018/019660, 10 pages (dated May 16, 2018).

International Search Report and Written Opinion of International Application No. PCT/US2018/023784, 13 pages (dated Jul. 6, 2018).

International Search Report and Written Opinion of International Application No. PCT/US2018/023798, 12 pages (dated Jul. 6, 2018).

Katz, J., "Ozone and Chlorine Dioxide Technology for Disinfection of Drinking Water," Pollution Technology Review, No. 67, 669 Pages; ISBN-10: 0815508026; ISBN-13: 978-0815508021 (1980), Abstract only.

Wastewater Disinfection—MOP FD-10, Water Environment Federation, Alexandria, VA; Report No. MFD10GT, 300p; Accession No. WEF0009 (1996), Abstract only.

Yin, G., et al., "Addition of H2O2 to a methanol based ClO2 generator to decrease Cl2 emission: Mills trials resulted in a 60% reduction in chlorine emissions from stack gases," *Pulp & Paper Canada*, 104(5):62-64 (2003), Abstract only.

Zhang, Jiku., et al., "Study of manufacturing high pure chlorine dioxide with multi-stage compound chlorine dioxide generator," *Advanced Materials Research*, 550-553:3125-3130 (2012), Abstract only.

Detsch, Richard M. et al. "Sound amplification from controlled excitation reactions: Experimental observations in chemically reacting H2/Cl2 mixtures," Journal of the Acoustical Society of America (Feb. 1985), 77(2), pp. 512-519.

Smith, James A. "Using the sounds of nuclear power," Journal of the Acoustical Society of America (2016), 139, p. 2159. (English Abstract only.).

* cited by examiner

METHOD FOR ONSITE PRODUCTION OF CHLORINE DIOXIDE

BACKGROUND

1. Field of the Invention

The present disclosure generally relates to a method of treating process water using a reactor for generating chlorine dioxide onsite.

2. Description of the Related Art

Industrial water systems are subject to various sorts of fouling. Fouling can occur in the form of mineral fouling, biological fouling, and often combinations of the two. In fact mineral fouling often provides an anchor and substrate for biological infestations, and some organisms leach or secrete minerals onto industrial water system surfaces.

Fouling may occur as a result of a variety of mechanisms including deposition of air-borne and water-borne and water-formed contaminants, water stagnation, process leaks, and other factors. If allowed to progress, fouling can cause a system to suffer from decreased operational efficiency, premature equipment failure, loss in productivity, loss in product quality, and (in particular in the case of microbial fouling) increased health-related risks.

Biological fouling results from rapidly spreading microbial communities that develop on any wetted or semi-wetted surface of the water system. Once these microorganisms are present in the bulk water they will form biofilms on the system's solid surfaces.

Exopolymeric substance secreted from the microorganisms aid in the formation of biofilms as the microbial communities develop. These biofilms form complex ecosystems that establish a means for concentrating nutrients and offer protection for growth. Biofilms can accelerate scale, corrosion, and other fouling processes. Not only do biofilms contribute to reduction of system efficiencies, but they also provide an excellent environment for microbial proliferation that can include pathogenic bacteria. It is therefore important that biofilms and other fouling processes be reduced to the greatest extent possible to maximize process efficiency and minimize the health-related risks from water-borne pathogens.

Several factors contribute to the problem of biological fouling and govern its extent: temperature, pH, organic and inorganic nutrients, growth conditions such as aerobic or anaerobic conditions, and in some cases the presence or absence of sunlight. These factors influence what types of microorganisms might be present in the water system.

Many different prior art approaches have been attempted to control biological fouling of industrial processes. The most commonly used method is the application of biocidal compounds to the process waters. The biocides applied may be oxidizing or non-oxidizing in nature. Due to several different factors such as economics and environmental concerns, oxidizing biocides may be preferred. Oxidizing biocides such as chlorine gas, hypochlorous acid, bromine derived biocides, and other oxidizing biocides are widely used in the treatment of industrial water systems.

The efficacy of oxidizing biocides depends in part on the presence of components within the water matrix that would constitute a chlorine demand or oxidizing biocide demand. Chlorine-consuming substances include, but are not limited to, microorganisms, organic molecules, ammonia and amino derivatives; sulfides, cyanides, oxidizable cations, pulp lignins, starch, sugars, oil, water treatment additives like scale and corrosion inhibitors, etc. Microbial growth in the water and in biofilms contributes to the chlorine demand. Conventional oxidizing biocides were found to be ineffective in waters containing a high chlorine demand, including heavy slimes. Non-oxidizing biocides are usually recommended for such waters.

In some instances, microbes can adapt the constant levels of biocide treatment. New methods are needed that can provide an environment resistant to bacterial growth.

BRIEF SUMMARY

In some embodiments, a method is provided for treating process water in a cooling tower that may include the steps of: determining a chlorine dioxide level in the process water, an oxidation reduction potential (ORP) of the process water, and a pH of the process water; feeding an acid through a first feed line into a diluent stream in a diluent line or a solution in a tank; feeding a chlorate salt through a second feed line into the diluent steam or the solution in the tank; and injecting the diluent stream or the solution in the tank into the process water. The steps of feeding the acid and feeding the chlorate salt may be asynchronous.

In other embodiments, a method is disclosed for treating process water that may include the steps of: determining a chlorine dioxide level in the process water; feeding an acid through a first feed line into a diluent stream in a diluent line or a solution in a tank; feeding a chlorate salt through a second feed line into the diluent steam or the solution in the tank; and injecting the diluent stream or the solution in the tank into the process water. The steps of feeding the acid and feeding the chlorate salt may be asynchronous.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
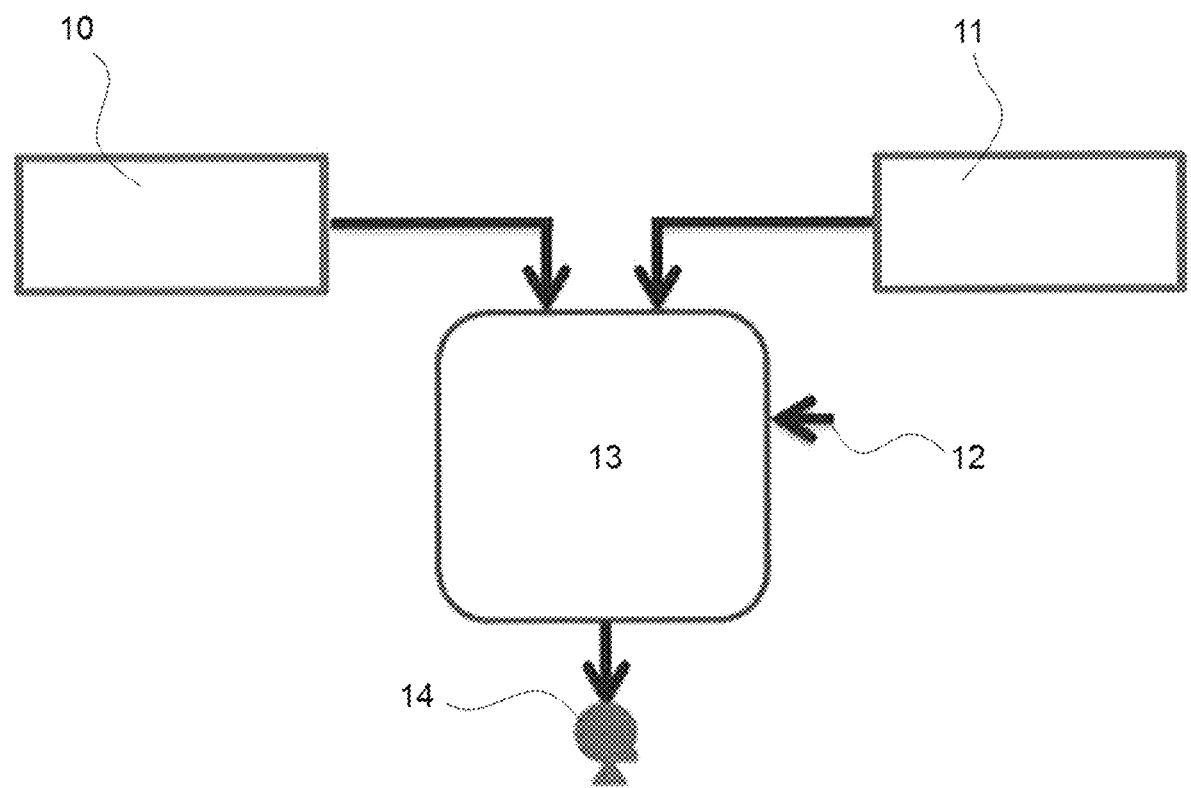
FIG. 1 shows a configuration for feeding concentrated reactants into a tank.

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

In some embodiments, a method is provided for treating process water in a cooling tower. The method may include the step of determining certain conditions or properties of the process water such as the chlorine dioxide level, oxidation reduction potential (ORP), pH, flow rate of any feed or injection streams, or fluid levels in any tanks. The method may include feeding an acid through a first feed line into a diluent stream in a diluent line or a solution in a tank. Another reactant, such as chlorate salt, may be fed through a second feed line into the diluent steam or the solution in the tank. Finally, the method may include injecting the diluent stream or the solution in the tank into the process water.

In some embodiments, the method may involve asynchronously feeding the acid and feeding the chlorate salt into the diluent stream or the tank.

Asynchronous feeding means that over a discrete period of time the steps of feeding the acid and feeding the chlorate salt do no overlap or do not occur at the same time. Asynchronous feeding may lead to mixing of the reactants in the diluent stream or the tank. Asynchronous feeding of the reactants may result in a changing or dynamic chlorine dioxide concentration in the tank or diluent stream. The changing chlorine dioxide concentration may be more ideal for killing certain organisms, and creating an environment to which organisms have difficulty adapting.

Asynchronous feeding may result in a safer system as there is no danger of a "runaway" reaction in controlled batch production that exits in continuous reactions.

In some embodiments, the asynchronous flow of reagents may be accomplished according to a "slug dose" strategy. In a slug dose the feeding alternates between low or non doses of one or more reagents and then concentrated feedings. For example, over a 24 hour period extending between hour 0 and hour 24, at some point between hour zero and hour 6 nothing is fed into the system, then for up to 6 hours acid or chlorate and hydrogen peroxide may be added, then for up to 6 hours both acid or chlorate and hydrogen peroxide are added asynchronously. In this regiment, the concentration of free acid, chlorate, hydrogen peroxide and chlorine dioxide varies. The slug dose can be targeted to be in synch with the expected growth and persistence of particular forms of biological infestation. In some embodiments, multiple slug doses can be fed per 24 hour period interspersed with periods of time in which nothing is fed to the system.

In other embodiments, the method includes feeding hydrogen peroxide through the second feed line. The chlorate salt and hydrogen peroxide may be premixed before feeding into the diluent stream or tank. In some embodiments, the method includes feeding a solution through the second feed line that contains about 40% by weight sodium chlorate and about 8% by weight hydrogen peroxide.

In other embodiments, the acid may be sulfuric acid. The sulfuric acid may be in an aqueous solution where the amount of sulfuric acid may be about 78% by weight.

In certain embodiments, the diluent stream may be water.

In some embodiments, the transition in the cross-section is not streamlined from the first feed line or the second feed line to the diluent line or the tank. The inside wall of the first and second feed lines may intersect the inside wall of the diluent line or tank at an angle of about 90 degrees. When the transition is not streamlined the two streams that intersect may mix more efficiently.

In some embodiments, the acid and the chlorate salt may be in a solid form. Hydrogen peroxide may be fed separately in an aqueous solution when solid chlorate salt is added.

In other embodiments, acid may be fed into the diluent stream or tank when the pH of the process water is at or above a predetermined pH set point. The pH set point of the process water may be between about 6 to about 9. The process water may be used in a cooling tower where it is undesirable to allow the pH to become too alkaline In certain embodiments, the chlorate salt may be fed into the diluent stream or tank when the oxidative state of the process water is below a predetermined ORP set point or the chlorine dioxide level in the process water is below a predetermined chlorine dioxide set point. The selection of appropriate set points for ORP and chlorine dioxide is well within the knowledge of one having ordinary skill in the art.

In some embodiments, the method may also include passing the diluent stream through a mixer. A mixing device may be placed on anywhere on the diluent line.

In other embodiments, the acid and the chlorate salt may react to form chlorine dioxide when both the acid and the chlorate salt are present in the diluent stream or the solution in the tank. The acid, the chlorate salt, and hydrogen peroxide may react to form chlorine dioxide. Even though the reactants may be fed asynchronously they may mix in the tank or diluent stream and react to form chlorine dioxide.

In other embodiments, the chlorine dioxide concentration in the diluent stream or the solution in the tank may fluctuate and change. The chlorine dioxide injected into the process water may be non-constant.

In some embodiments, the ORP of the process water may be determined using an ORP sensor that is in communication with a computer that converts a signal from the ORP sensor into a numerical value that corresponds to the ORP of the process water.

In other embodiments, the pH of the process water may be determined using a pH meter that is in communication with a computer that converts a signal from the pH meter into a numerical value that corresponds to the pH of the process water.

In certain embodiments, the chlorine dioxide level in the process water may be determined using a chlorine dioxide sensor that is in communication with a computer that converts a signal from the chlorine dioxide sensor into a numerical value that corresponds to the chlorine dioxide level.

In some embodiments, a method is disclosed for treating process water. The method may include determining the chlorine dioxide level in the process water. The method may include at least two feed lines: a first feed line and a second feed line. An acid may be fed through the first feed line into a diluent stream in a diluent line or a solution in a tank. A chlorate salt may be fed through a second feed line into the diluent steam or the solution in the tank. The method may also include injecting the diluent stream or the solution in the tank into the process water. The addition of the acid and the chlorate salt are asynchronous. Asynchronous feeding may be as described above.

In some embodiments, the diluent stream or the solution in the tank may have a fluctuating chlorine dioxide concentration. At any given moment the proportions of reactants may vary, since the reactants may be fed into the diluent stream or the tank asynchronously.

In other embodiments, the flow of at least one of the reactants is governed by a feeding mechanism. The feeding mechanism may be in informational communication with one or more forms of diagnostic equipment. The diagnostic equipment may measure and transmit the measurement of such variables as pH, temperature, amount of biological infestation, type of biological infestation, and concentrations of one or more compositions of matter. The measurement may be of any portion of the system to be treated and/or in any portion of the feed line(s). In certain embodiments, the feeding mechanism may be constructed and arranged to increase, decrease, or cease the flow of at least one reagent in response to receiving at least one transmitted measurement.

In some embodiments, no chlorine gas is produced. Chlorine gas may form unwanted side-products.

In other embodiments, the tank may include a mixer to maintain a homogenous solution in the tank. The diluent lines may also include a mixing device to assist in blending the diluent stream with the reactants.

The figures represent certain embodiments for the configuration of the certain features of the disclosed method. The figures are not intended to limit the embodiments described above.

Referring to FIG. 1, which shows a first reactant 10 such as concentrated acid that may be fed directly into a tank 13. A second reactant 11 such as chlorate salt or a solution of chlorate and hydrogen peroxide may be may be added directly to the tank 13. A diluent line 12 may feed a diluent stream into the tank 13. An injection line 14 may feed the solution in the tank 13 into process water.

Figure 2:
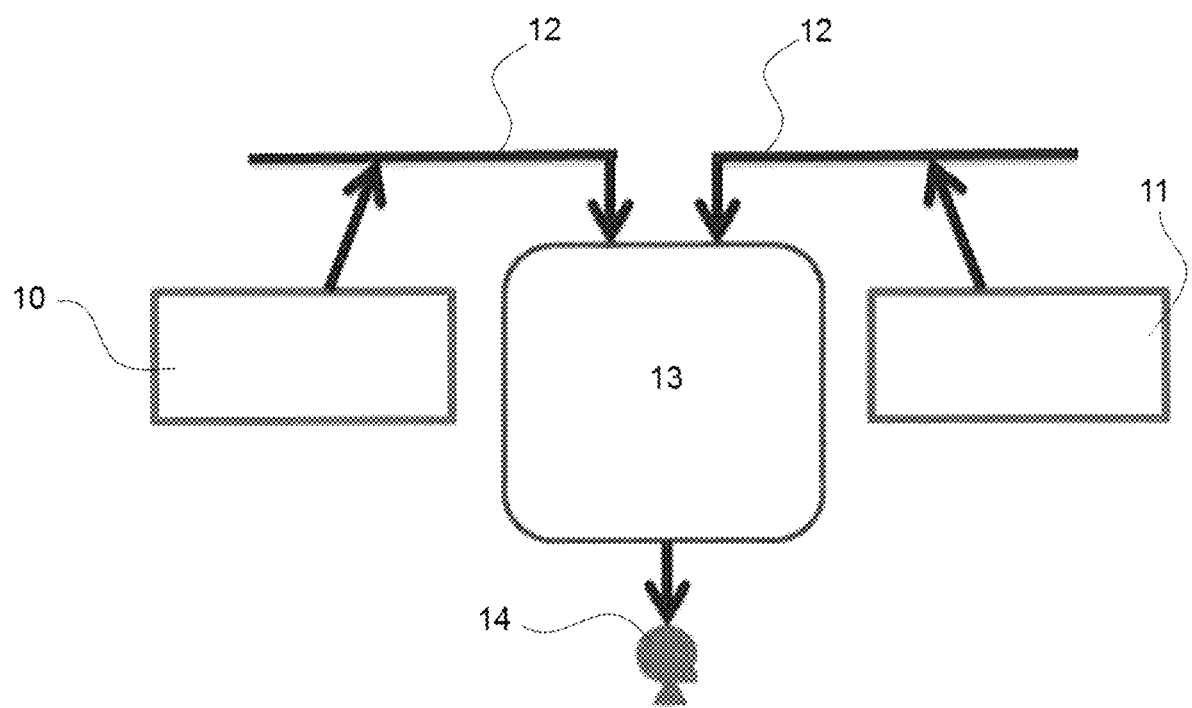
FIG. 2 shows a configuration of separately diluting concentrated reactants before feeding to a tank.

FIG. 2 shows an embodiment where the first reactant 10 and second reactant 11 may be added to separate diluent lines 12. The diluent lines 12 then carry the diluted reactants to the tank 13. The reactants may mix and react in the tank 13 to form chlorine dioxide. In some embodiments, the diluent lines 12 may include in-line mixers (not pictured).

Figure 3:
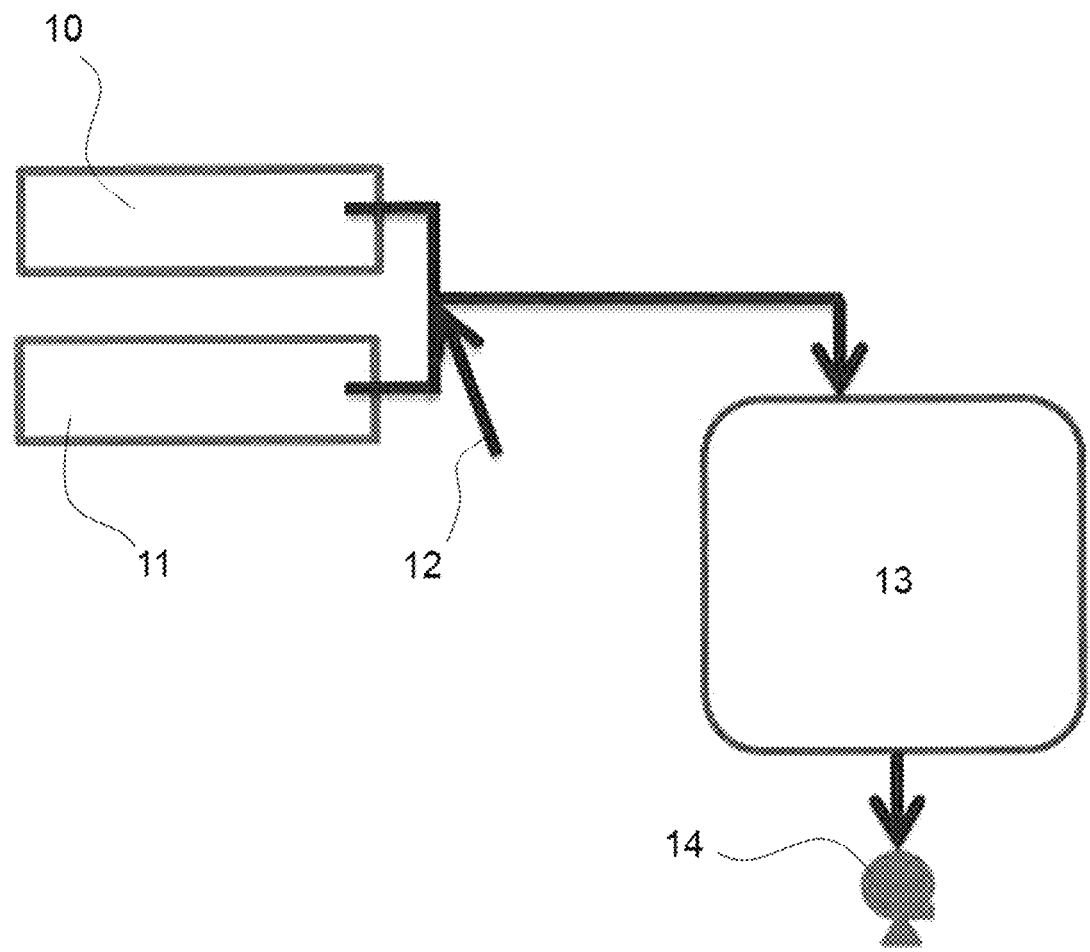
FIG. 3 shows a configuration of mixing and diluting the concentrated reactants together before feeding into a tank.

FIG. 3 shows an embodiment where the first reactant 10 and second reactant 11 may be mixed together before entering the tank 13. At the point where the reactants are mixed, a diluent line 12 may dilute the reactants as they are being mixed.

Figure 4:
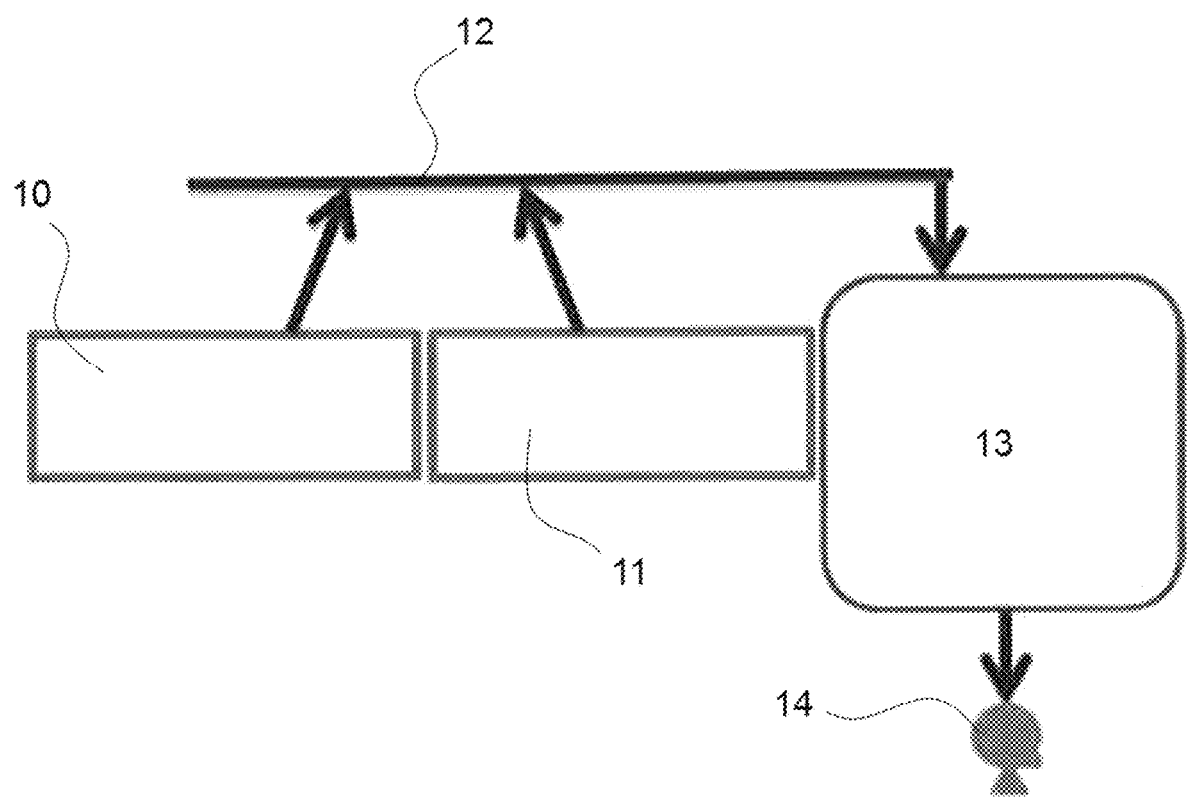
FIG. 4 shows a configuration of adding concentrated reactants to a diluent stream before feeding to the tank.

FIG. 4 shows an embodiment where the reactants 10 and 11 are added sequentially to the diluent line 12. In some embodiments, the addition of the second reactant 11 to the diluent line 12 may precede the addition of the first reactant 10.

Figure 5:
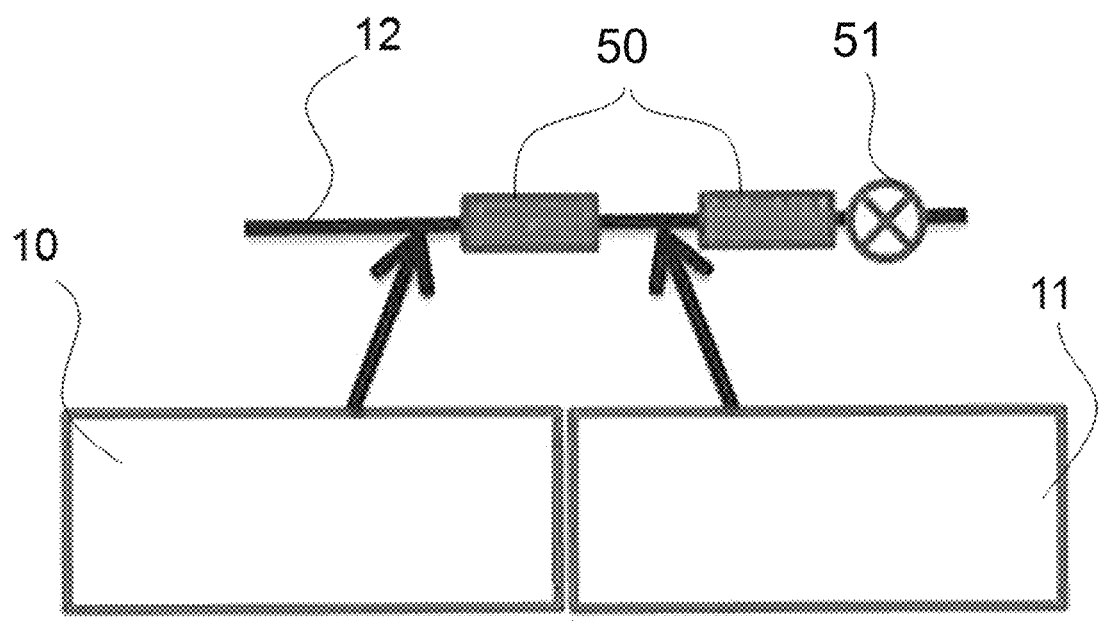
FIG. 5 shows a configuration of adding concentrated reactants to a diluent stream.

FIG. 5 shows an embodiment where the diluent line 12 includes mixing devices 50 and a valve 51. The valve 51 may control the flow of chlorine dioxide to the process water.

Figure 6:
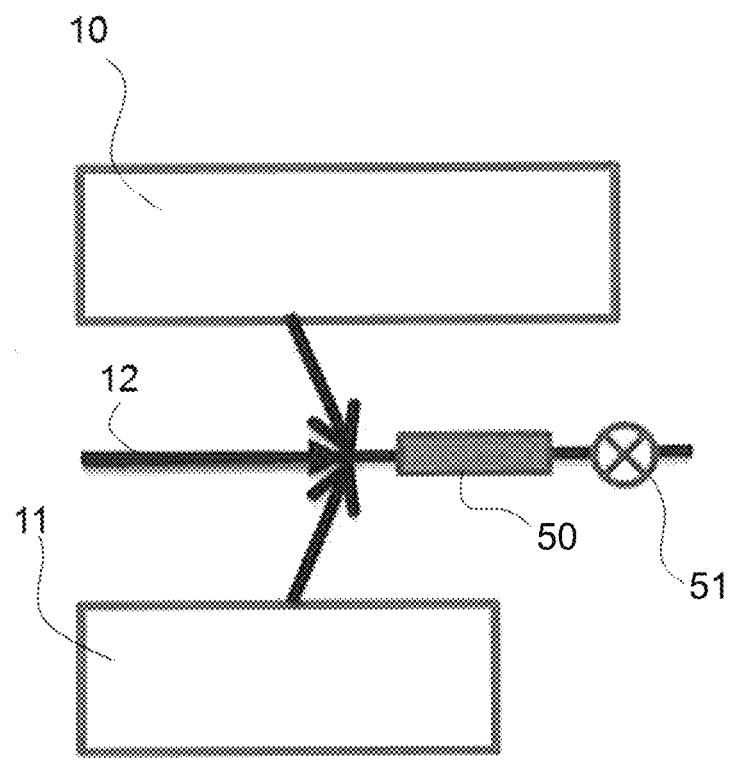
FIG. 6 shows a configuration of mixing and diluting the concentrated reactants together before feeding to a mixer.

FIG. 6 shows an embodiment where the reactants 10 and 11 are added to the diluent line 12 at the same point prior to a mixing device 50 and a valve 51.

EXAMPLES

Prophetic Example 1

Two separate solutions will be prepared. The first solution will be a sodium chlorate solution with concentration of about 40% w/w in water. This solution will also contain hydrogen peroxide at a concentration of about 8% w/w. The second solution will be sulfuric acid at a nominal concentration of about 78% in water. These two solutions will serve as the concentrated precursor solutions for the production of chlorine dioxide. In an experimental setup, dilute solutions for the two precursors will be diluted in water from the concentrated precursors. The dilute solutions of the two precursors will be added to a beaker and allowed to mix to produce the chlorine dioxide solution. The dilute precursors will be blended in varying amounts to simulate a variation in molar ratios between the reactant chemistries. The chlorine dioxide produced will be measured using an oxidant monitoring technology such as an iodometric titration method.

Prophetic Example 2

In this example, two separate solution will be prepared. The first solution will be sodium chlorate at a concentration of about 40% w/w in water. This solution will also contain hydrogen peroxide at a concentration of about 8% w/w. The second solution will be sulfuric acid at a nominal concentration of about 78% in water. These two solutions will serve as the concentrated precursor solutions for the production of chlorine dioxide. In an experimental setup, a known amount of water, which will serve as the diluent, will be added to a reaction vessel. To the diluent solution, known amounts of the two precursor chemistries will be added. The mixture will be allowed to mix to produce the chlorine dioxide solution. The precursors will be blended in varying amounts to simulate a variation in molar ratios between the reactant chemistries. The chlorine dioxide produced will be measured using an oxidant monitoring technology such as an iodometric titration method.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a sensor" is intended to include "at least one sensor" or "one or more sensors."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of treating process water in a cooling tower, comprising:

determining a chlorine dioxide level in the process water, an oxidation reduction potential (ORP) of the process water, and a pH of the process water;

feeding an acid through a first feed line into a diluent stream in a diluent line;

feeding a chlorate salt through a second feed line into the diluent stream in the diluent line;

passing the diluent stream in the diluent line through a first mixer after feeding the first feed line and before feeding the second feed line into the diluent stream in the diluent line, and passing the diluent stream in the diluent line through a second mixer before the diluent stream in the diluent line is injected into the process water but after the diluent stream in the diluent line is passed through the first mixer, and injecting the diluent stream in the diluent line into the process water.

2. The method of claim 1, further comprising feeding hydrogen peroxide through the second feed line, and wherein the acid is sulfuric acid and the diluent stream in the diluent line comprises water.

3. The method of claim 1, wherein a transition in a cross-section from the first feed line or the second feed line to the diluent stream in the diluent line is not streamlined.

4. The method of claim 1, wherein the acid and the chlorate salt are in a solid form.

5. The method of claim 1, wherein feeding the acid is performed when the pH of the process water is above a predetermined pH set point.

6. The method of claim 1, wherein feeding the chlorate salt is performed when an oxidative state of the process water is below a predetermined ORP set point or the chlorine dioxide level in the process water is below a predetermined chlorine dioxide set point.

7. The method of claim 1, further comprising reacting the acid and the chlorate salt to form chlorine dioxide when both the acid and the chlorate salt are present in the diluent stream in the diluent line.

8. The method of claim 1, wherein the diluent stream in the diluent line comprises a fluctuating chlorine dioxide concentration.

9. The method of claim 1, wherein determining the ORP of the process water is performed using an ORP sensor that is in communication with a computer that converts a signal from the ORP sensor into a numerical value that corresponds to the ORP of the process water.

10. The method of claim 1, wherein determining the pH of the process water is performed using a pH meter that is in communication with a computer that converts a signal from the pH meter into a numerical value that corresponds to the pH of the process water.

11. The method of claim 1, wherein determining the chlorine dioxide level in the process water is performed using a chlorine dioxide sensor that is in communication with a computer that converts a signal from the chlorine dioxide sensor into a numerical value that corresponds to the chlorine dioxide level in the process water.

12. A method of treating process water, comprising:

determining a chlorine dioxide level, an oxidation reduction potential (ORP), and a pH of the process water;

feeding an acid through a first feed line into a diluent stream in a diluent line;

feeding a chlorate salt through a second feed line into the diluent stream steam in the diluent line;

injecting the diluent stream in the diluent line into the process water;

passing the acid through a first mixer; and passing the chlorate salt through a second mixer;

wherein feeding the acid and feeding the chlorate salt do not occur at the same time.

13. The method of claim 12, further comprising feeding hydrogen peroxide through the second feed line.

14. The method of claim 12, wherein a transition in a cross- section from the first feed line or the second feed line to the diluent stream in the diluent line is not streamlined.

15. The method of claim 12, wherein the acid and the chlorate salt are in a solid form.

16. The method of claim 12, wherein the diluent stream in the diluent line comprises water or wherein the acid is sulfuric acid.

17. The method of claim 12, wherein the diluent stream in the diluent line comprises a fluctuating chlorine dioxide concentration.

18. The method of claim 1, wherein no chlorine gas is produced.

19. The method of claim 5, wherein the predetermined pH set point is from about 6 to about 9.

* * * * *

UNITED STATES PATENT AND TRADEMARK OFFICE
CERTIFICATE OF CORRECTION

PATENT NO. : 11,535,541 B2
APPLICATION NO. : 15/905030
DATED : December 27, 2022
INVENTOR(S) : Amit Gupta It is certified that error appears in the above-identified patent and that said Letters Patent is hereby corrected as shown below:

In the Claims

Column 7, In Claim 1, Line 13, delete "inj ected" and add --injected--

Column 7, In Claim 1, Line 17, delete "water ." and add --water.--

Column 8, In Claim 12, Line 20, after "diluent stream" delete "steam"

Signed and Sealed this
Eighth Day of August, 2023

*Katherine Kelly Vidal*

Katherine Kelly Vidal
*Director of the United States Patent and Trademark Office*